(12) United States Patent
Yowonske

(10) Patent No.: US 8,046,929 B2
(45) Date of Patent: Nov. 1, 2011

(54) STRETCH LEVEL

(75) Inventor: Frank T. Yowonske, Big Pine Key, FL (US)

(73) Assignee: Stretch Level, LLC, Big Pine Key, FL (US)

( * ) Notice: Subject to any disclaimer, the term of this patent is extended or adjusted under 35 U.S.C. 154(b) by 0 days.

(21) Appl. No.: 12/787,535

(22) Filed: May 26, 2010

(65) Prior Publication Data

US 2010/0325906 A1 Dec. 30, 2010

Related U.S. Application Data

(60) Provisional application No. 61/213,612, filed on Jun. 24, 2009.

(51) Int. Cl.
*G01C 9/28* (2006.01)
(52) U.S. Cl. ............................. 33/374; 33/451; 33/809
(58) Field of Classification Search .................... 33/374, 33/375, 451, 464, 809
See application file for complete search history.

(56) References Cited

U.S. PATENT DOCUMENTS

| | | | | |
|---|---|---|---|---|
| 4,152,838 | A * | 5/1979 | Cook | 33/374 |
| 4,989,332 | A * | 2/1991 | Worrallo | 33/451 |
| 5,249,365 | A * | 10/1993 | Santiago | 33/374 |
| 5,459,935 | A * | 10/1995 | Paulson et al. | 33/451 |
| 5,535,523 | A * | 7/1996 | Endris | 33/451 |
| 5,713,135 | A * | 2/1998 | Acopulos | 33/451 |
| 6,836,973 | B1 * | 1/2005 | Eccles, Jr. | 33/374 |
| 7,299,560 | B2 * | 11/2007 | Diaz et al. | 33/451 |
| 7,562,463 | B2 * | 7/2009 | Vaes | 33/374 |
| 2002/0121026 | A1 * | 9/2002 | Pustay | 33/374 |
| 2009/0113733 | A1 * | 5/2009 | Hale | 33/375 |
| 2010/0000107 | A1 * | 1/2010 | Cobb et al. | 33/374 |

* cited by examiner

*Primary Examiner* — Brad Bennett
(74) *Attorney, Agent, or Firm* — Lesley Ann Rhyne

(57) ABSTRACT

A level 11 is provided comprising a base 1 having a top reference edge 2 and recession 3 wherein a slidable member 8 fits within the recession 3 of the base 1 and is slidable to extend the top reference edge 2 of the base for multiple lengths. Further embodiments of the present invention provide a level 11 having attachment means to level at various angles and additional lengths.

18 Claims, 17 Drawing Sheets

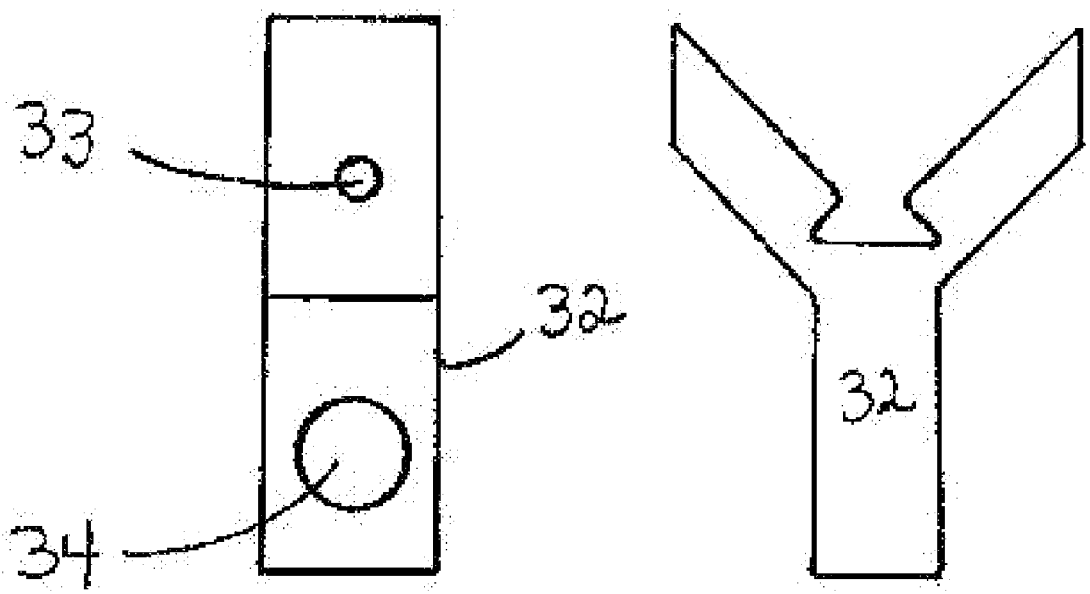
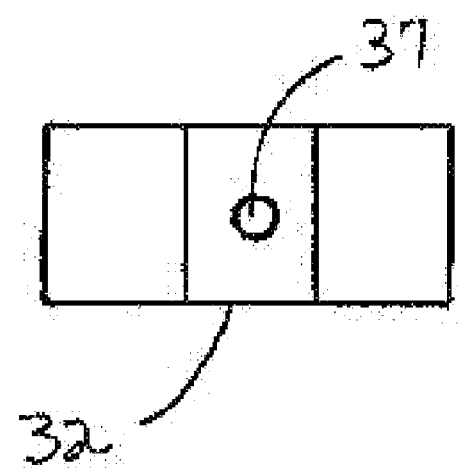
FIG. 14

STRETCH LEVEL

CROSS-REFERENCE TO RELATED APPLICATIONS

The present utility patent application claims priority to U.S. Provisional Patent Application No. 61/213,612 filed Jun. 24, 2009, and entitled "STRETCH LEVEL," which is incorporated in full by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Invention

This invention relates in general to a level, and more particularly to a level comprising a base having a top reference edge and a recession adjacent to the top recession edge; and a slidable member that fits within the recession of the base wherein the member is slidable to extend the top reference edge of the base for multiple lengths.

(2) Background Art

The present invention relates to a level used in carpentry or construction, and more particularly, to an extendible level.

A level is an instrument or indicating tool used to ascertain true vertical, horizontal or 45 degrees with regard to a given surface. Typically such levels consist of a linear framework with liquid filled tubes placed strategically within the framework. Each liquid filled tube contains an air bubble which indicates by its position in the tube whether a surface is horizontally or vertically level. Such instruments may also be used to indicate whether the surface is a true 45 degrees. When the instrument is set on a true even plane the air bubble in the tube centers itself exactly in an indication window. Conversely, the air bubble that is not centered may indicate to what degree the surface is not horizontal or vertical. Such tubes may be filled with alcohol or ether. These well known tubes may be commonly referred to as level bubbles or spirit bubbles.

Levels are used in all areas of construction and are particularly necessary with regard to installing walls, doors, panels, frames, etc. Levels used in building construction or carpentry are available in all shapes and sizes. However, if a level is not long enough for a surface and has to be moved to different places on a surface, the accuracy of the resultant indications of the level is reduced. A level becomes more susceptible to error when it moves between points on a surface. The most accurate results are for a level that can cover the exact length of the surface to be leveled. However, such levels would be too big and cumbersome at certain lengths.

Prior art levels that are extendible to different lengths are available in the industry. Such extendible levels, however, do not allow for a continuous edge or top line of the level for scribing a level line. Furthermore, such available extendible levels are complicated and not easy to use during the process of leveling. The extendible parts of the prior art levels must be put into place before placing on a surface or leveling a surface. Moreover, they do not provide for a continuous reference level line.

Furthermore, prior art extendible levels do not have a system or a method to level right angles or in a protractor type arrangement. Such arrangements would be desirable to accurately level the more intrinsic designs in the field of construction and carpentry.

Thus, there is a need to provide an extendible level that allows for a continuity of measurement of a surface. There is a further need to provide a level that extends a top reference line for accurately leveling different lengths of a surface. Such an extendible level needs to be easily and smoothly extendible so that during the process of leveling it may be extended to different lengths. Such levels need to be easy to use, accurate and uncomplicated to manufacture.

BRIEF SUMMARY OF THE INVENTION

According to the present invention a level is provided comprising a base having a top reference edge and recession wherein a slidable member fits within the recession of the base and is slidable to extend the top reference edge of the base for multiple lengths.

The present invention may further include the slidable member fitting within the recession of the base member by a mating male dovetail part located on the bottom side of the slidable member and fitting within a mating female dovetail part in the recession of the base member.

The present invention may further include attachment means such as a linear bracket, a right angle bracket and a protractor bracket for attaching two levels together.

The present invention may further include a trammel point sliding attachment and a trammel point pivot attachment.

The present invention solves the problem of the prior art by providing a level that extends a top reference line for accurately leveling different lengths of a surface. The present invention further allows for attachment means on the same extendible level for extending the leveling surface, leveling at a right angle, leveling with a protractor at various angles and facilitating the use of the level with a trammel point.

BRIEF DESCRIPTION OF THE SEVERAL VIEWS OF THE DRAWINGS

FIG. 14 shows left side, front, and bottom views of a trammel point sliding attachment means according to an embodiment of the present invention.

DETAILED DESCRIPTION OF THE INVENTION

The present utility patent application claims priority to U.S. Provisional Patent Application No. 61/213,612 filed Jun. 24, 2009, and entitled "STRETCH LEVEL," and hereby incorporates said application herein.

Figure 1:
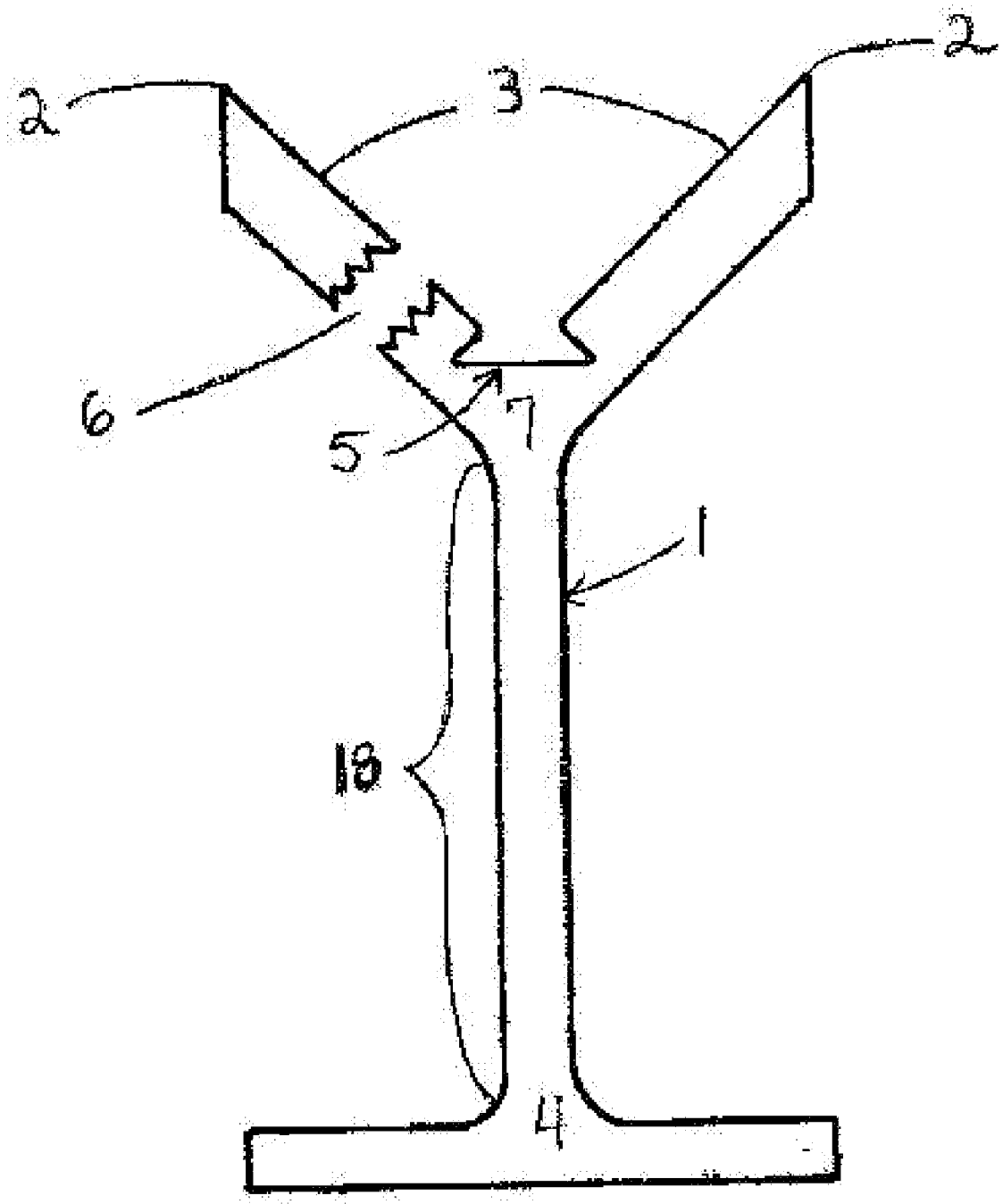
FIG. 1 shows a front section view of a base member of a level according to an embodiment of the present invention.

FIG. 1 shows a front section view of a base member 1 of a level according to a preferred embodiment of the present invention. The base member 1 has a top reference edge 2 adjacent to a recession 3 in the base member 1. In fact, there are two top reference edges 2 (as shown in FIG. 1) that are adjacent to two top sides of the recession 3 in the base member 1 so that either side of the base member 1 may used to level a given surface equally. The bottom portion 4 of the base member 1 forms an upside T and extends out from the base member equal to the top portion 7 of the base member 1. The top portion 7 of the base member 1 is shaped in a Y. A stem portion 18 connects the top portion 7 and the bottom portion 4. Thus, the stem portion 18 is the linear portion of the top portion 7 and the bottom portion 4 of the base member 1 as shown in FIG. 1. The top portion 7 includes a mating female dove tail part 5 in a preferred embodiment of the present invention. The base member 1 includes a hole 6 drilled into a side of the top portion 7 for receiving a locking mechanism, such as a screw 43 or cammed lever 45. See FIG. 6. Any locking mechanism as known in the art may be used as described further below. A rule 53 may also be added to a side or face of the base member 1.

Figure 2:
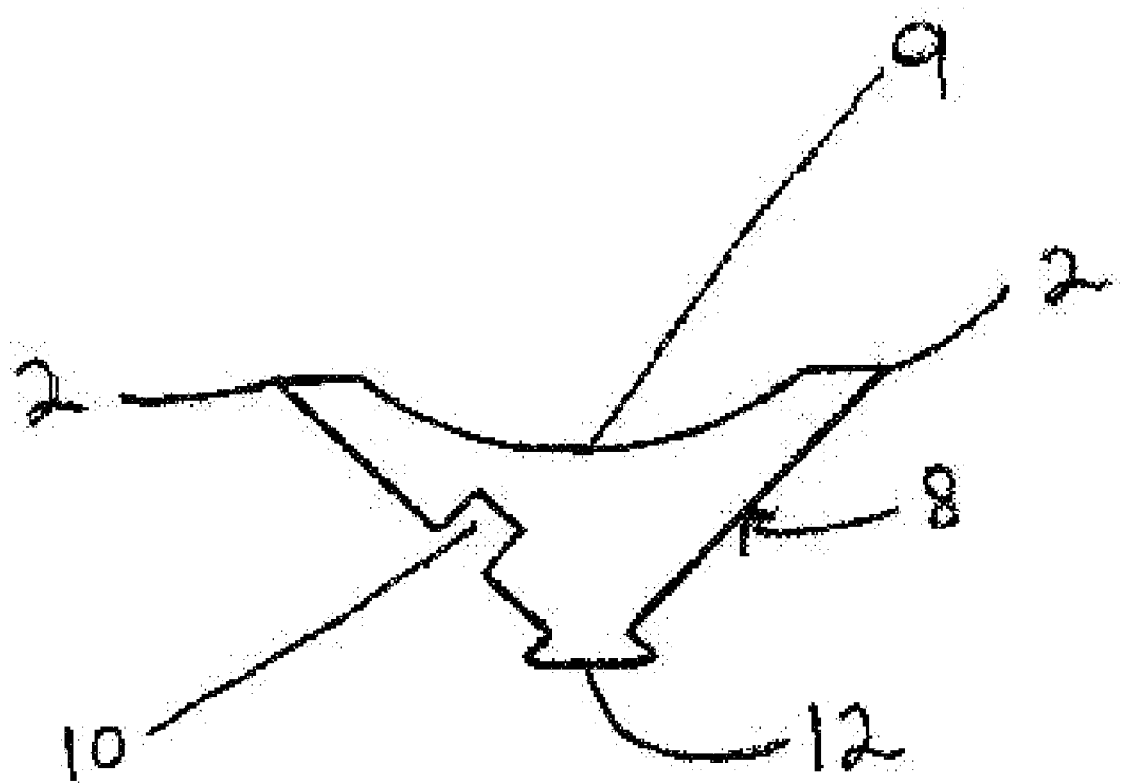
FIG. 2 shows a front section view of a slidable member of a level according to an embodiment of the present invention.

FIG. 2 shows a front section view of a slidable member 8 of a level according to the preferred embodiment of the present invention. The slidable member 8 includes two top reference edges 2. The slidable member 8 further includes a cove top 9 for holding a scribing instrument such as a pencil or any other small tool used in the art. The cove top 9 may run the entire length of the slidable member 8. A channel 10 or groove is carved along the outside of one side of the slidable member 8 in order to accept the locking mechanism as described in FIG. 1. The bottom portion of the slidable member 8 is shaped as a mating male dovetail part 12.

Figure 3:
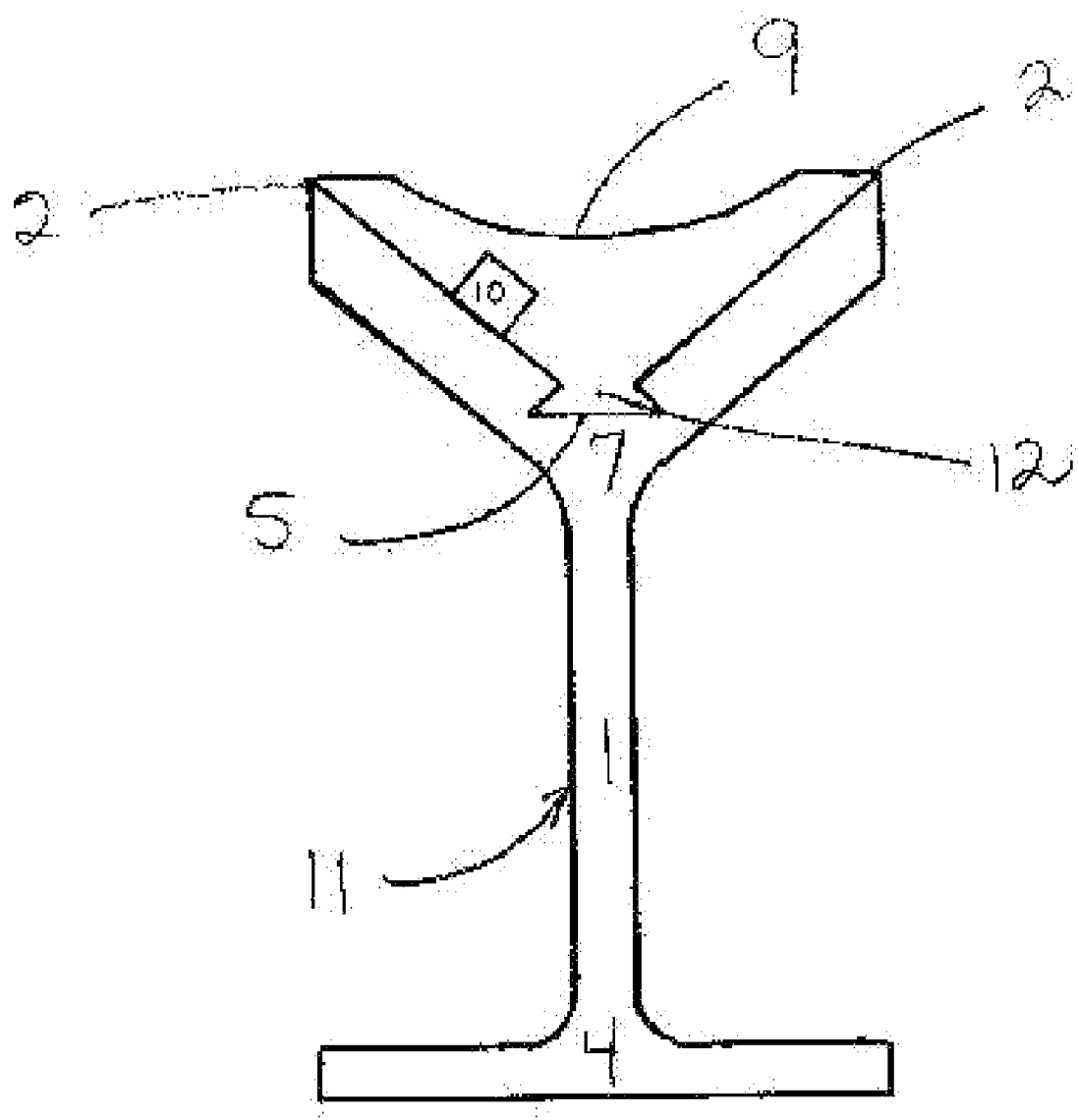
FIG. 3 shows a front section view of a level according to an embodiment of the present invention.
Figure 16:
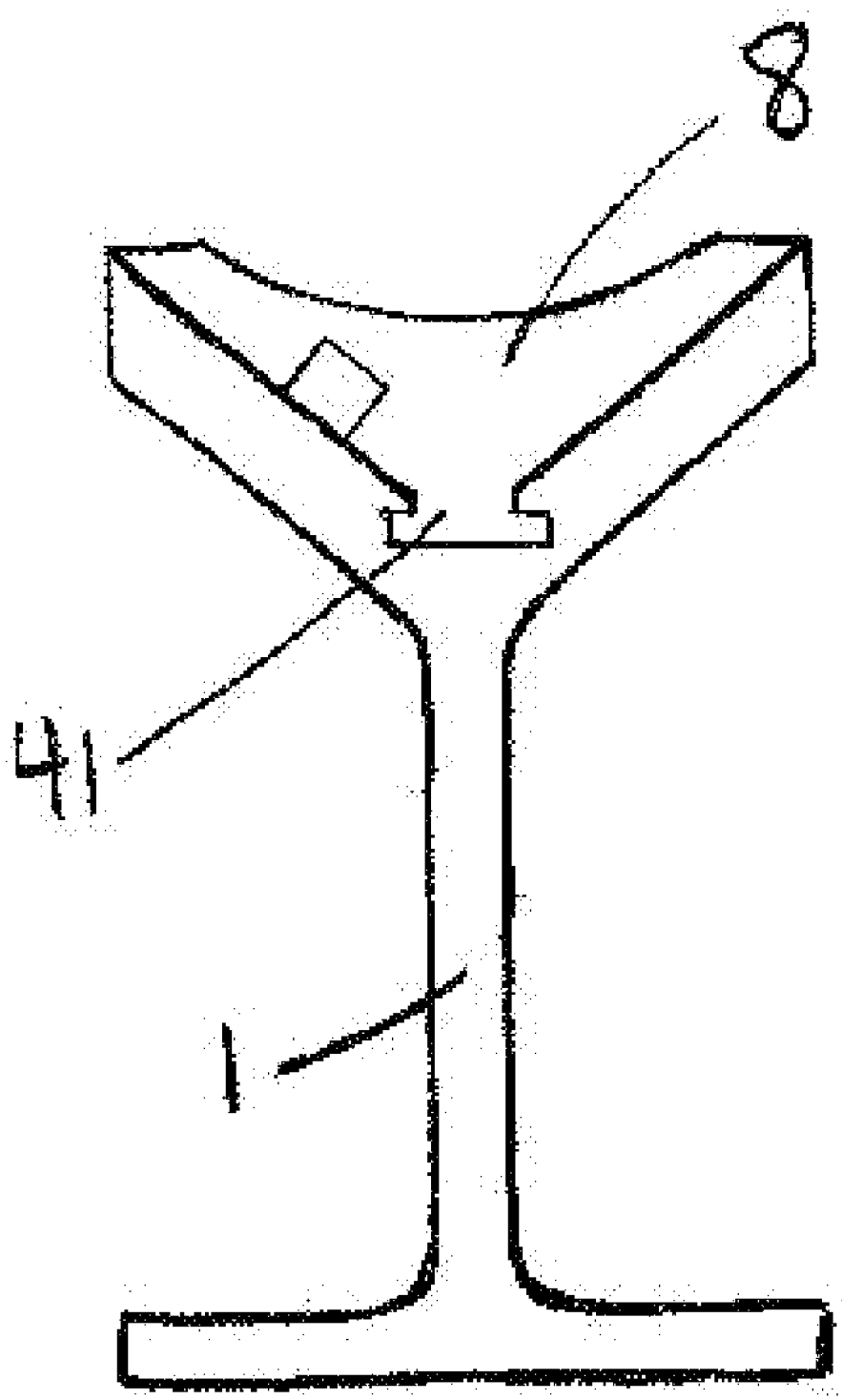
FIG. 16 shows an alternative embodiment of the present invention.
Figure 17:
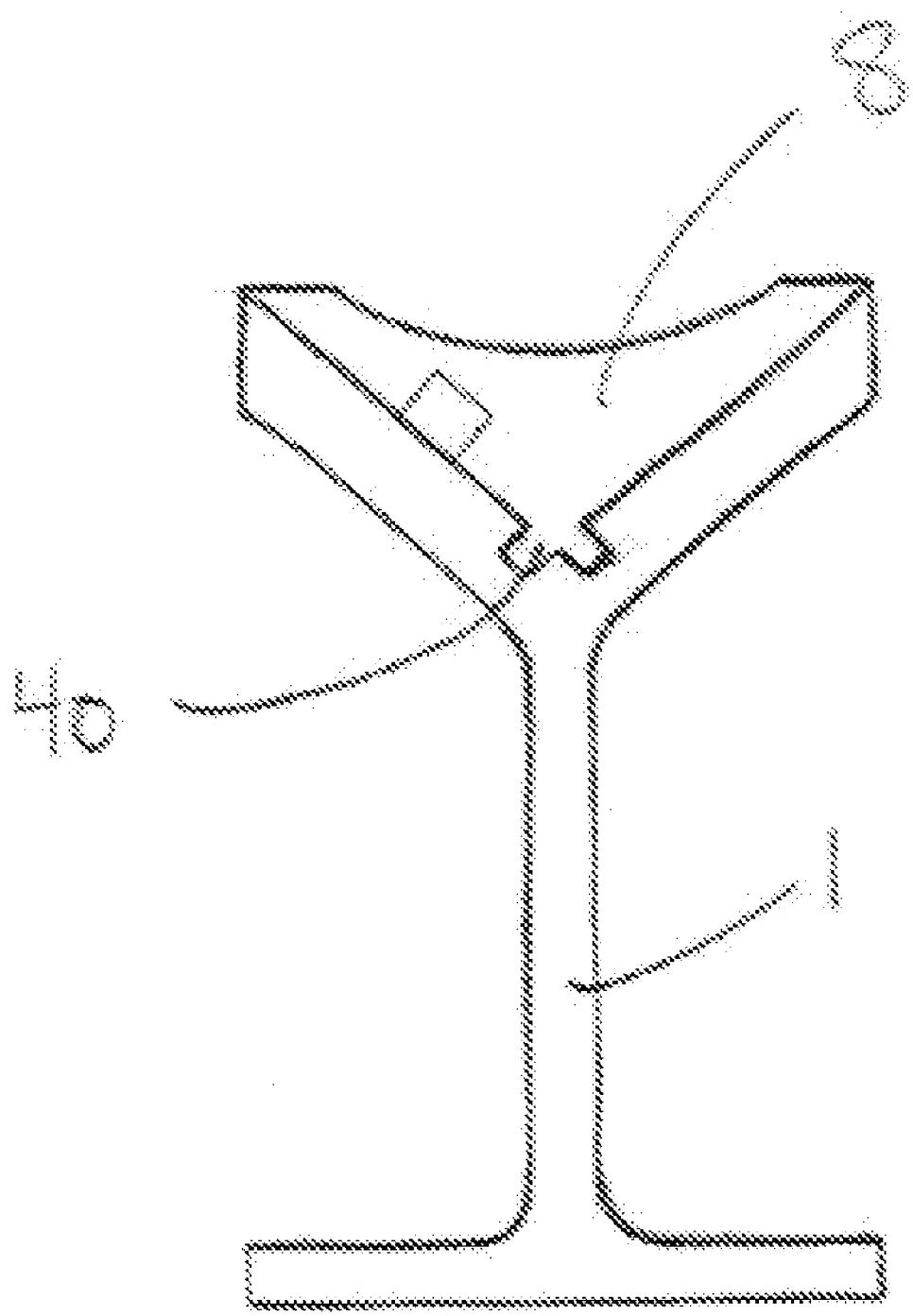
FIG. 17 shows an alternative embodiment of the present invention.

FIG. 3 shows a front section view of a level 11 according to a preferred embodiment of the present invention. The slidable member 8 fits within the recession of the base member 1 by the mating male dovetail part 12 of the slidable member 8 fitting within the mating female dovetail part 5 of the base member 1. Although, the slidable member 8 and the base member 1 are described as slidably attachable by a dovetail design, any design known by those skilled in the art may be used. For example, FIG. 16 shows an upside down T design or configuration 41 for slidably attaching the base member 1 to the slidable member 8 in an alternative embodiment of the present invention. Similarly, FIG. 17 shows an X design or configuration as an alternative.

Figure 4:
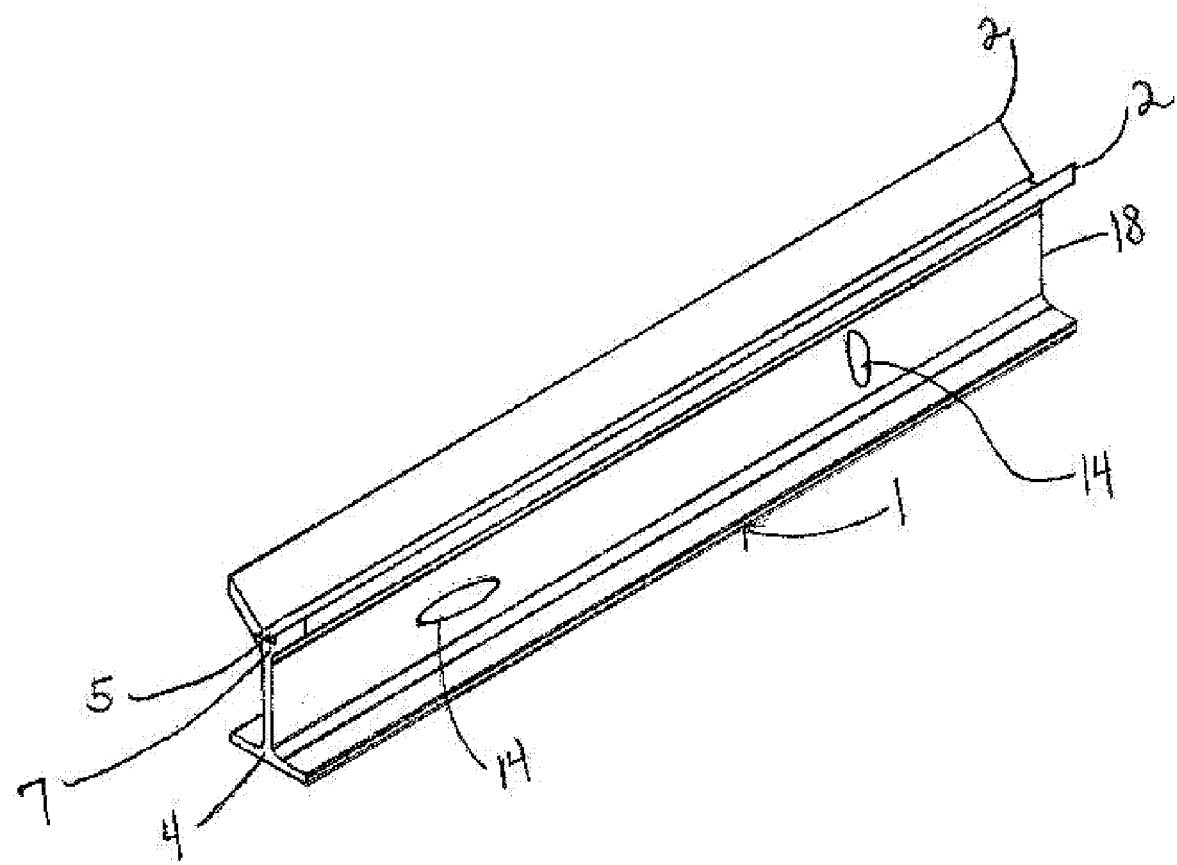
FIG. 4 shows a perspective view of a base member of a level according to an embodiment of the present invention.

FIG. 4 shows a perspective view of a base member 1 of a level according to the preferred embodiment of the present invention. Two spirit bubbles 14 are shown within the base member 11. The spirit bubbles 14 may be of various types and accuracy. Such spirit bubbles 14 may also be replaceable. Although two spirit bubbles 14 are shown in FIG. 4, any number of spirit bubbles 14 may be used in the base member 1. Furthermore, the spirit bubbles 14 may be inserted and attached within the base member 1 so that they may be seen from either side of the base member 1. In a further embodiment of the present invention the base member 1 may include a digital scale. Also the base member 1 may include a hole for storing or carrying the level 11. A further embodiment may include a hole for holding the level 11 while adjusting.

Figure 5:
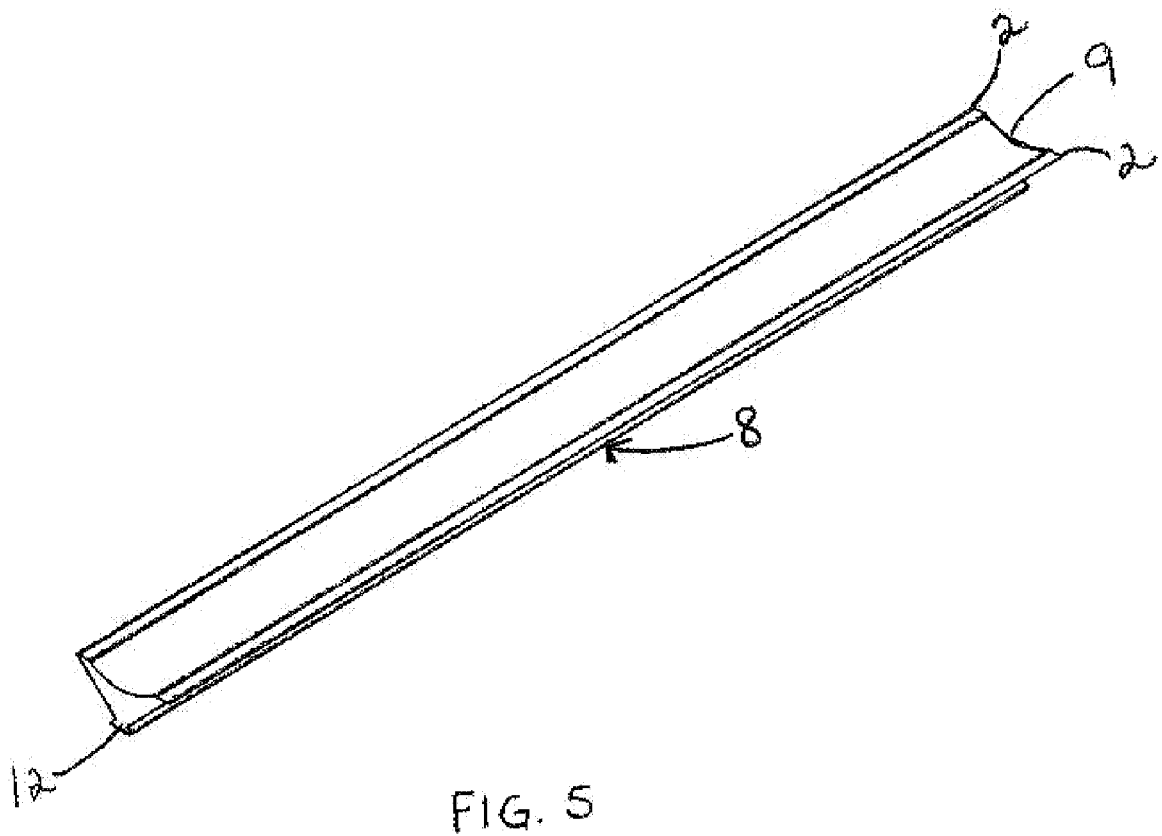
FIG. 5 shows a perspective view of a slidable member of a level according to an embodiment of the present invention.

FIG. 5 shows a perspective view of a slidable member 8 of a level according to a preferred embodiment of the present invention. In a further embodiment, the slidable member 8 may include a rule etched into a top surface for easy measurements. In an alternative embodiment, the slidable member 8 may include a light or a laser located in the slidable member 8.

Figure 6:
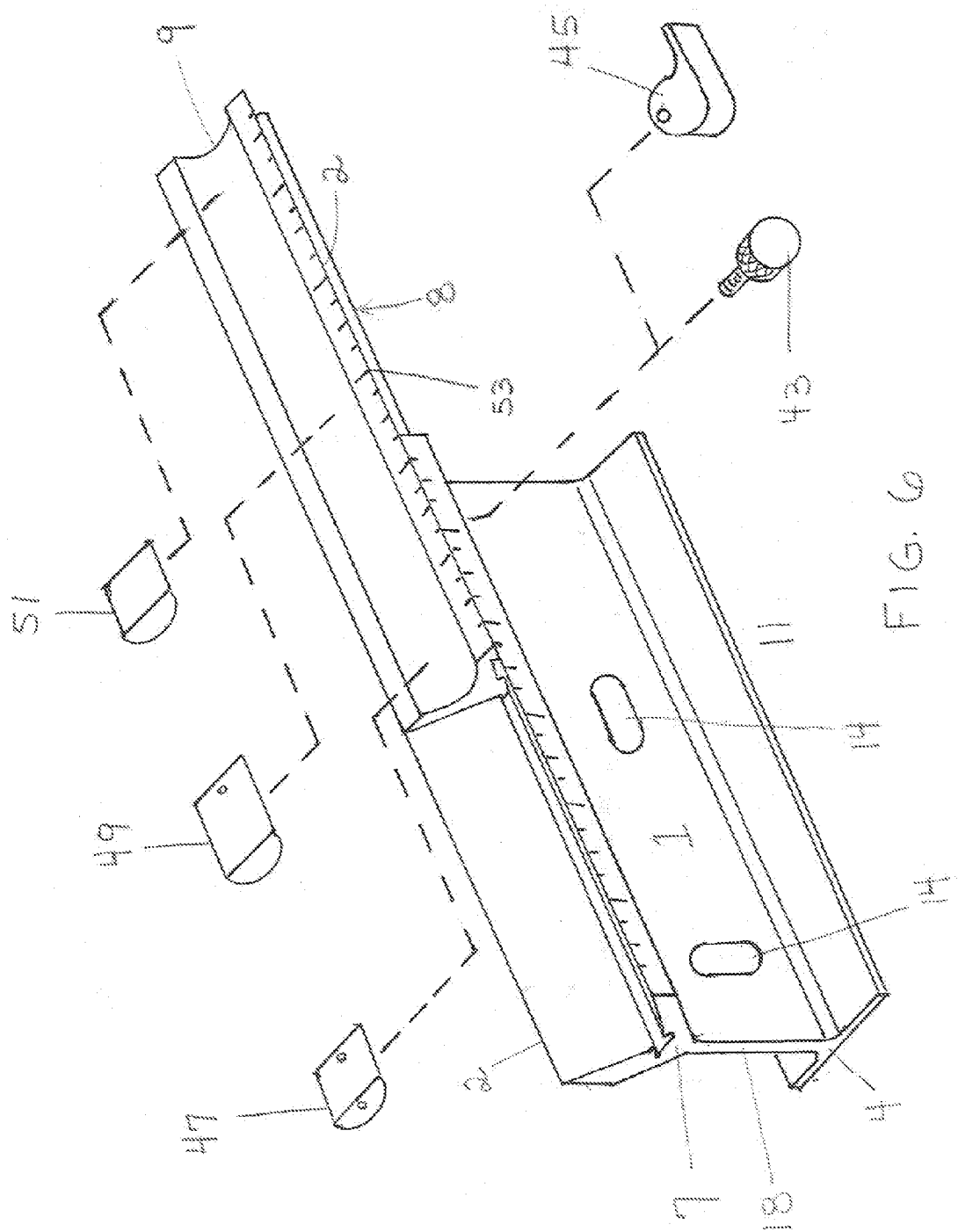
FIG. 6 shows a perspective view of a level in one configuration according to an embodiment of the present invention.

FIG. 6 shows a perspective view of a level 11 assembled with the base member 1 and the slidable member 8 extended in one configuration according to a preferred embodiment of the present invention. The top reference edges 2 of the slidable member 8 measure exactly equal to the top reference edges 2 of the base member 1. FIG. 6 shows how the slidable member 8 easily slides within the recession 3 to extend the top reference edges 2 beyond the base member 1. The slidable member 8 may slide out from the base member 1 and extend the top reference edges 2 approximately 75% further than the length of the base member 1 itself. For example, a 14 inch level 11 will extend to 24.5 inches, a 24 inch level 11 will extend to 42 inches, a 41.5 inch level 11 will extend to 72.5 inches, and a 72 inch level 11 will extend to 126 inches. In addition, a smaller scale torpedo version level 11 which measures 8 inches and extends to 14 inches may also be available. Thus, such level 11 lengths provide leveling references from 8 inches to 126 inches in five different sizes. The present invention anticipates that a number of different sizes of levels 11 may be provided. However, many different level 11 lengths may also be contemplated by those skilled in the art.

Once the level 11 has been extended and adjusted to a desired position, a user may easily remove a marking instrument from the cove 9 and mark an entire line with complete accuracy and increased productivity. When the level 11 is in its extended position there is no variance between the top reference edge 2 points indicated by the base member and the top reference edge points indicated by the slidable member 8. Thus, the level 11 of the present invention allows accurate leveling between two points that are further apart than the length of the base member 1. A user may quickly and easily scribe between points that are further apart than the base member 1. The level 11 was designed so that the level 11 does not need to be moved a number of times to level between two points longer than the base member 1 of the level 11. Moving a level 11 a number of times decreases the accuracy of the level measurement and/or line scribed as a result thereof. The level 11 of the present invention reduces such inaccuracies.

The level 11 of the present invention allows a user to scribe a straight line along the top reference edge 2 without any variance or obstruction.

In a further embodiment of the present invention, a magnet 51 may be located in the recession 3 of the base member 1 with a mating magnet being located on the slidable member 8 so that the slidable member 8 may be moved with some force in the recession of the base member 1 but then is easily locked into a desired position by the attraction forces of the magnets. A light, such as a LED light 49 or a laser 47, may also be added to the channel 9 of the slidable member 8.

Figure 7:
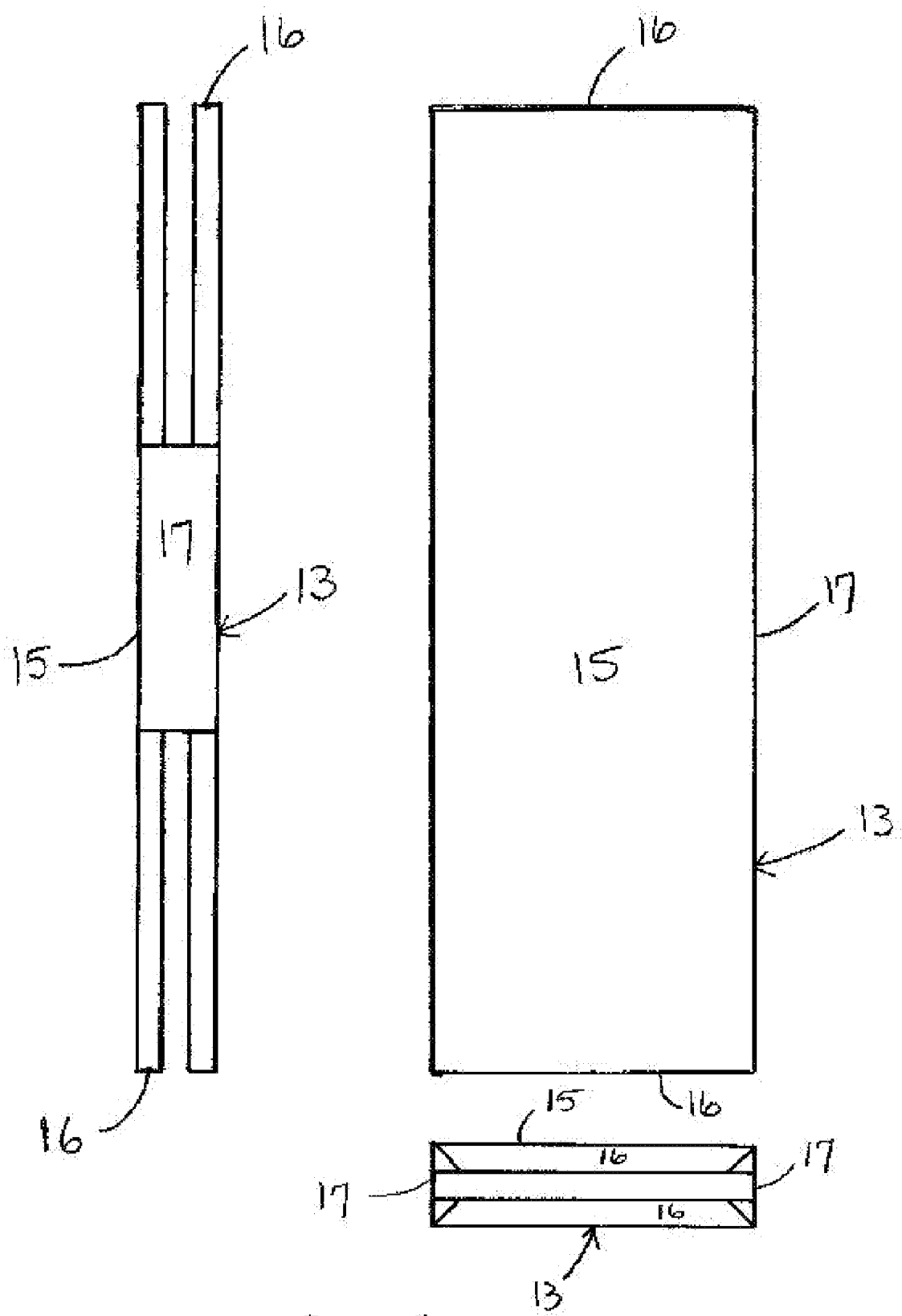
FIG. 7 shows front, top, and side views of a linear attachment means according to an embodiment of the present invention.

In an alternative embodiment of the present invention, attachment means are attached to the level 11 of the present invention to provided further extension, right angle assembly, protractor assembly, and trammel point assembly. Thus, the present invention further provides the level 11 of the present invention to level at even further lengths, different angles and multiple curves. FIG. 7 shows front, top, and side views of a linear attachment means according to an embodiment of the present invention. The linear attachment means may be a straight mounting or linear bracket 13 that is constructed to attach two levels 11 together in a linear fashion. The front side view 17 of the linear bracket 13 shows two extensions 16 on both sides of the linear bracket 13 for snugly receiving a fully assembled level 11. The top 15 width is the same length as the stem portion 18 of the base member 1 of the level 11. Thus, the linear bracket 13 fits snugly on the stem portion 18 of the levels 11 and allows the top portion 7 with the slidable member 8 and the bottom portion 4 to be used as previously described in the present invention.

Figure 8:
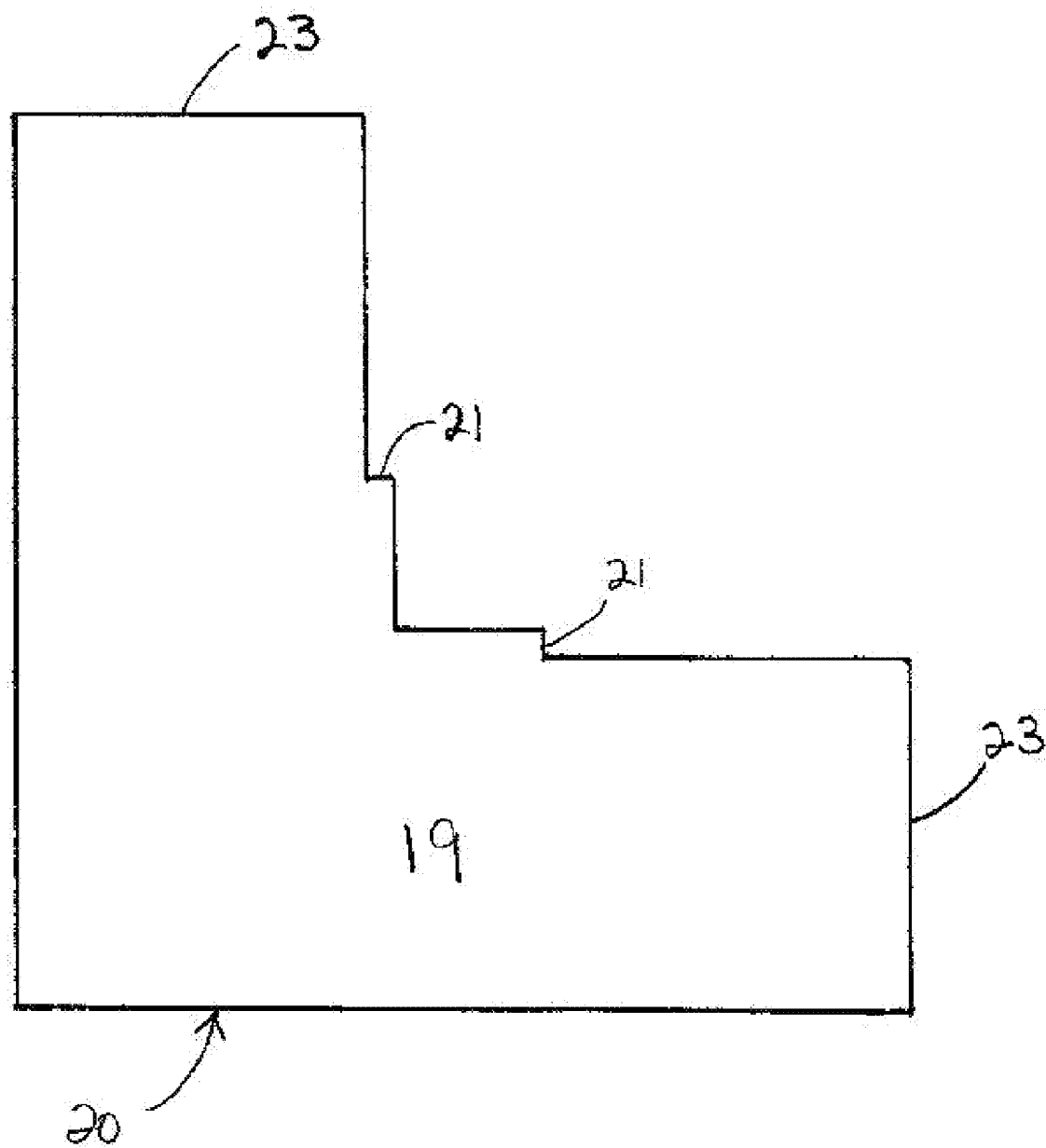
FIG. 8 shows a front view of a right angle attachment means according to an embodiment of the present invention.

FIG. 8 shows a front view of a right angle attachment means according to an embodiment of the present invention. The right angle attachment means may be a right angle bracket 20 having a front side 19 and appendices 21. The appendices 21 allow for the level 11 to be oriented in any fashion so that the slidable member 8 may face the inside or the outside of the right angle bracket 20. Thus, the right angle bracket 20 fits snugly on the stem portion 18 of the levels 11 and allows the top portion 7 with the slidable member 8 and the bottom portion 4 to be used as previously described in the present invention.

Figure 9:
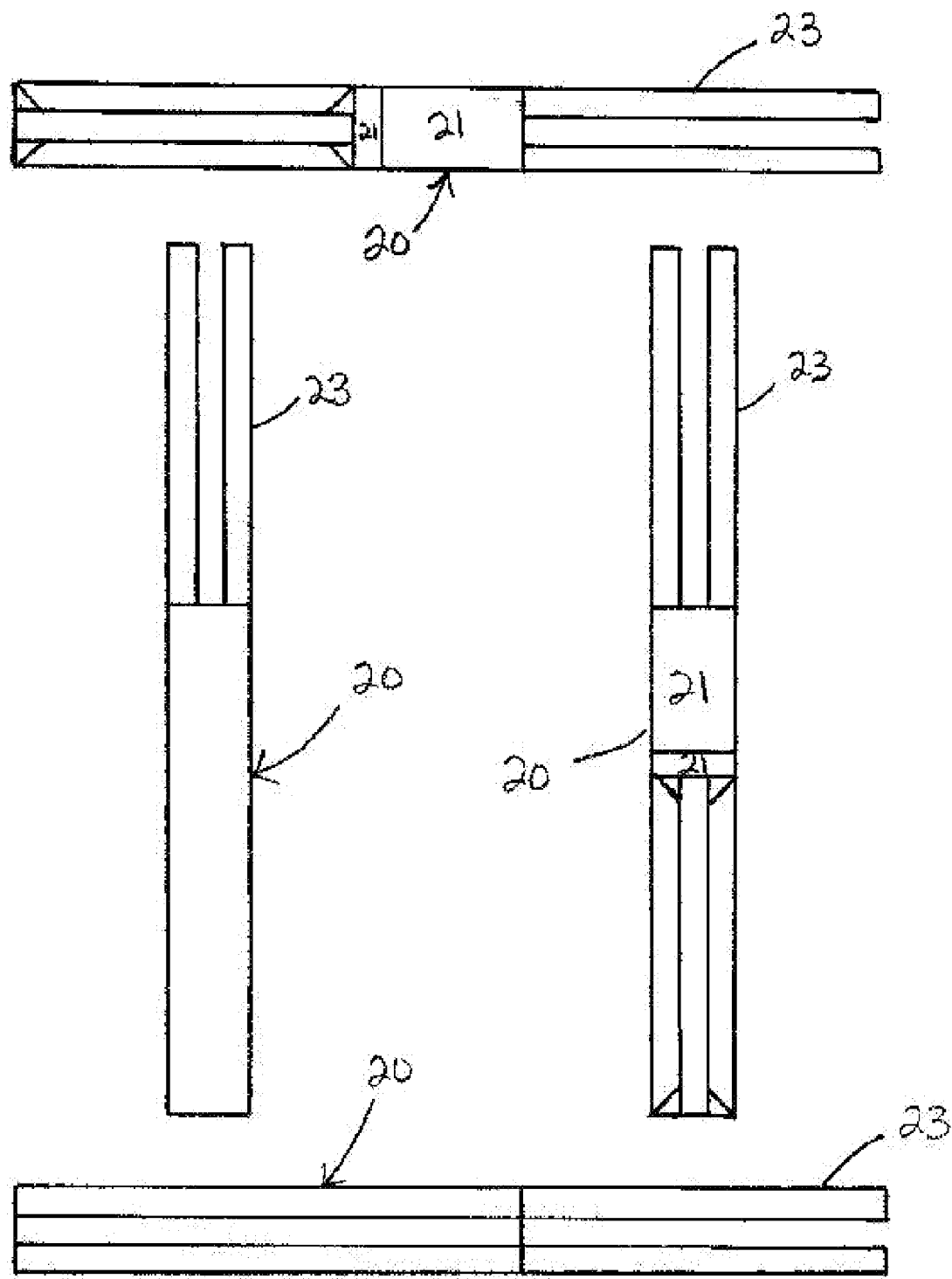
FIG. 9 shows top, left side, right side, and bottom views of a right angle attachment means according to an embodiment of the present invention.

FIG. 9 shows top, left side, right side, and bottom views of a right angle bracket 20 according to an embodiment of the present invention. Similar as described with respect to the linear bracket 13, the level 11 of the present invention snugly fits within the extensions 23 of the right angle bracket 20. The level 11 may be attached between the extensions 23 of the right angle bracket 20, as previously described in either orientation, with the slidable member 8 on the inside or on the outside of the right angle bracket 20. The right angle bracket 20 attaches two levels 11 at a 90 degree angle or right angle.

Figure 10:
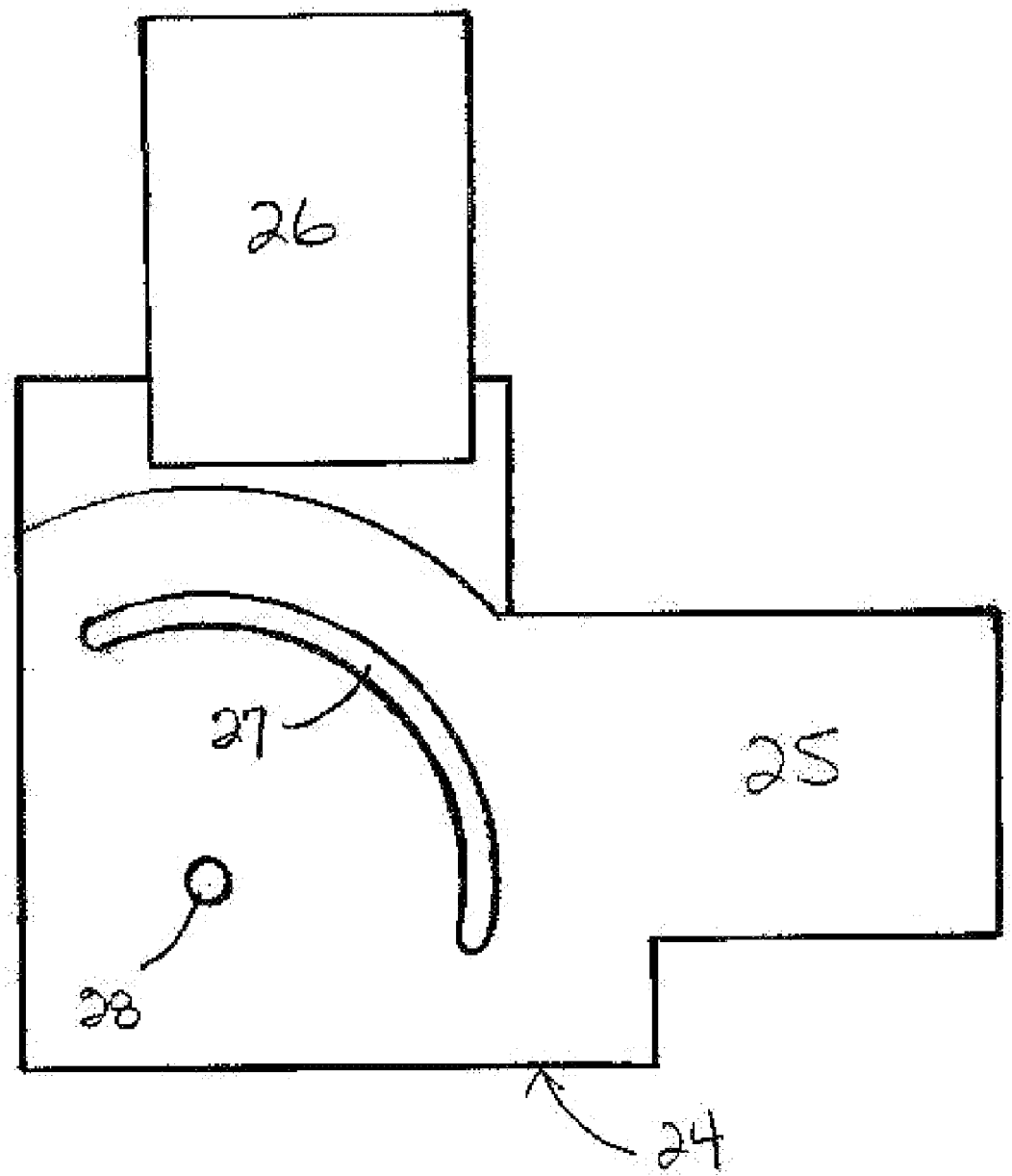
FIG. 10 shows a front view of a protractor attachment means according to an embodiment of the present invention.

FIG. 10 shows a front view of a protractor attachment means according to an embodiment of the present invention. The protractor attachment means or protractor bracket 24 includes a slotted base 25 and a pivoting member 26. Both the slotted base 25 and the pivoting member 26 are designed to receive levels 11 as previously described with regard to the aforementioned attachment means. The slotted base 25 is designed to receive the pivoting member 26 so as to allow the pivoting member 26 to revolve on a pivot point 28. The slotted base 25 allows the pivoting member 26 to revolve on the pivot point 28 while a level 11 is attached to the pivoting member 26 and a second level 11 is attached to the slotted base. A locking screw may be inserted in a radius slot 27 of the slotted base 25 to lock the pivoting member 26 in a desired place. Also as previously described, the protractor bracket 24 allows the levels 11 be attached between the extensions 29 of the slotted base 25 and the pivoting member 26, as previously described in either orientation, with the slidable member 8 on the inside or on the outside of the protractor bracket 20 angle.

Figure 11:
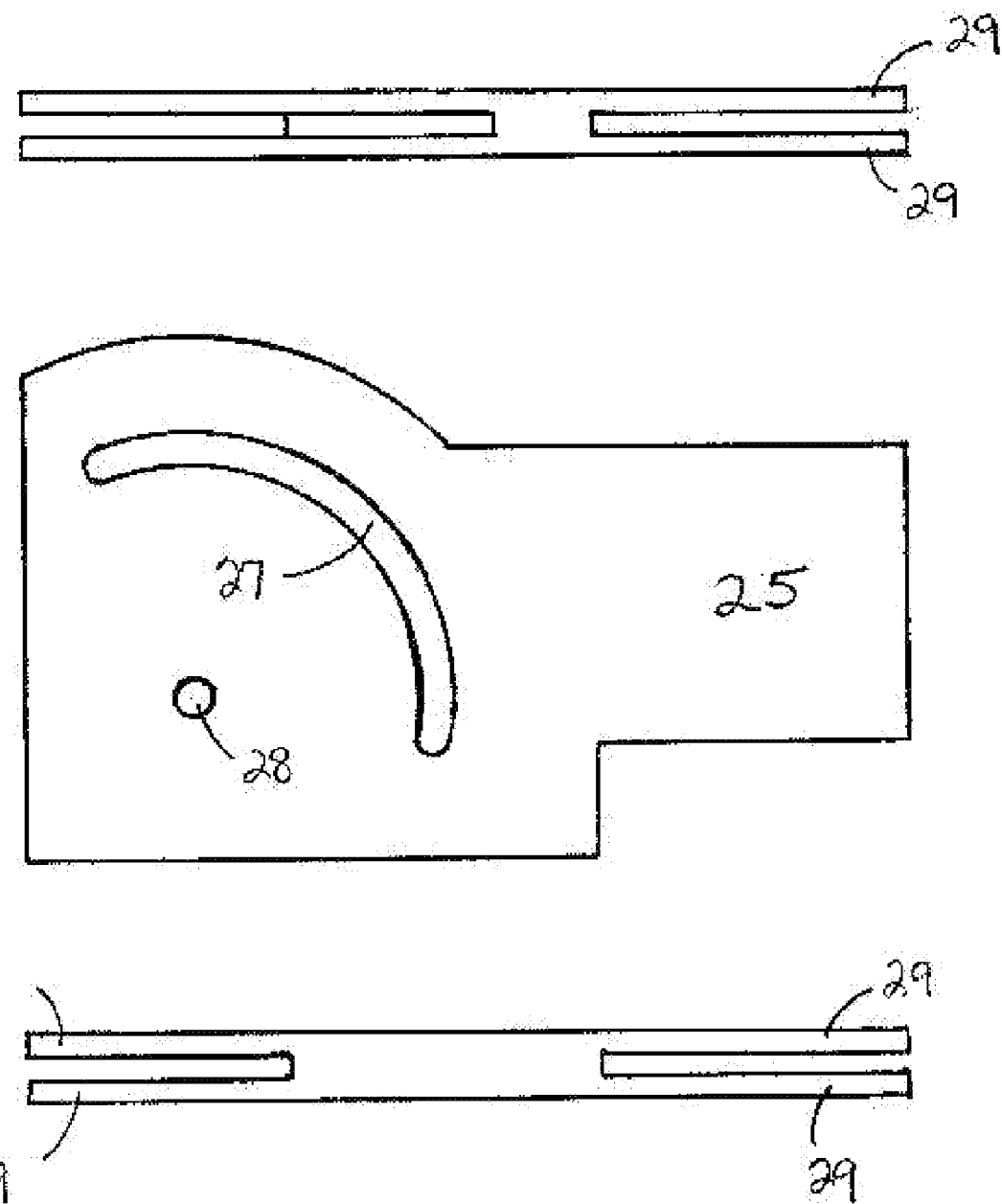
FIG. 11 shows top, front, and bottom views of a slotted base of a protractor attachment means according to an embodiment of the present invention.

FIG. 11 shows top, front, and bottom views of the slotted base 25 of the protractor bracket 24 according to an embodiment of the present invention. The slotted base 25 includes the radius slot 27 and the pivot point 28. The slotted base will receive a level 11 and the pivoting member between the extensions 29 as shown in the top and bottom views of the slotted base 25 in FIG. 11. The width of the extension 29 is the same length as the stem portion 18 of the base member 1 of the level 11. A scale in degrees of angle may be drawn to on the outside of the radius slot 27. The scale allows accurate determination of the angle in degrees between the levels 11 when rotated in the slotted base 25.

Figure 12:
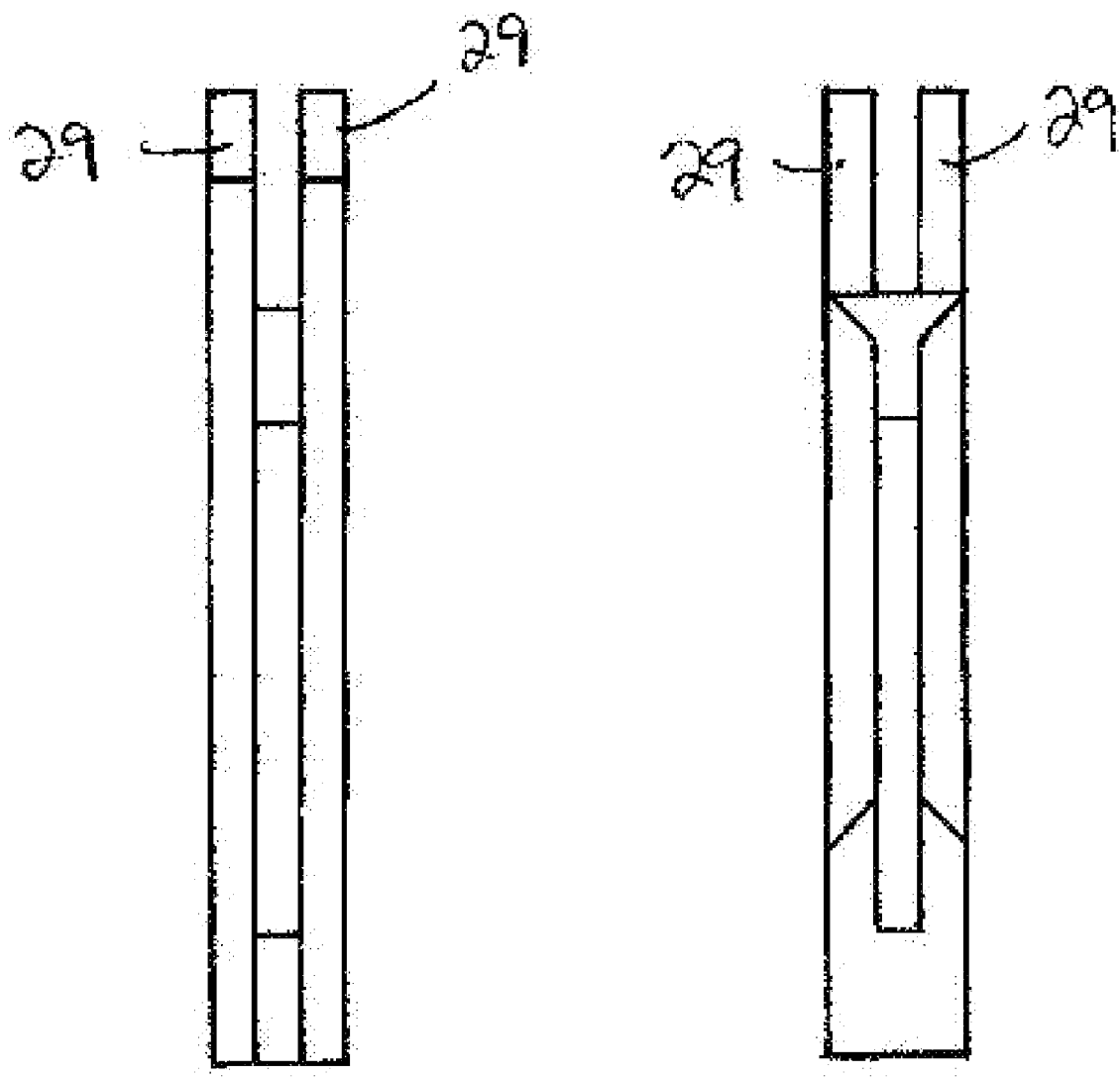
FIG. 12 shows left side and a right side views front view of a slotted base of a protractor attachment means according to an embodiment of the present invention.

FIG. 12 shows left side and right side views of the slotted base 25 of the protractor bracket 24 according to an embodiment of the present invention. The slotted base 25 fits snugly on the stem portion 18 of the level 11 and allows the top portion 7 with the slidable member 8 and the bottom portion 4 to be used as previously described in the present invention.

Figure 13:
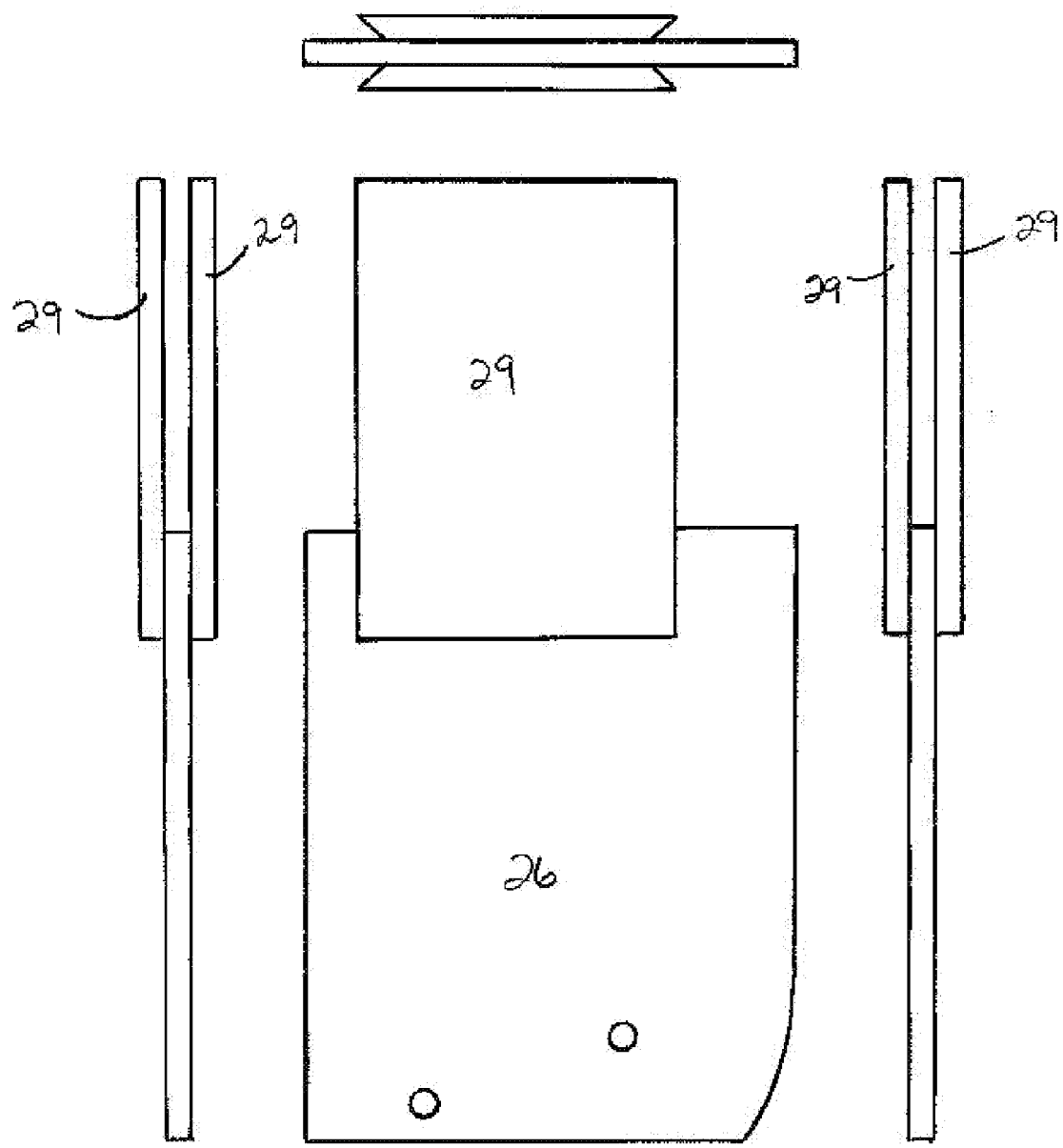
FIG. 13 shows top, left side, front, and right side views of a pivoting member of a protractor attachment means according to an embodiment of the present invention.

FIG. 13 shows top, left side, front, and right side views of the pivoting member 26 of the protractor bracket 24 according to an embodiment of the present invention. The width of the extension 29 is the same length as the stem portion 18 of the base member 1 of the level 11 to exactly attach the stem portion 18 of a level 11 between the extensions 29.

FIG. 14 shows left side, front, and bottom views of a trammel point sliding attachment 32 according to an embodiment of the present invention. The trammel point sliding attachment 32 is designed to fit specifically on the slidable member 8 of the level 11. The trammel point sliding attachment 32 may receive a threaded screw in a hole 33 on a side of the attachment 32. Such locking screw is designed to be received into the carved channel 10 on the slidable member 8. The larger hole 34 on the lower portion of the left side is designed to receive a pencil, pen, scribe, or other marking instrument. Such marking instruments may to be locked in place by an additional locking screw 37. The locking screw 37 may be positioned as shown in the bottom view of the trammel point sliding attachment 32.

Figure 15:
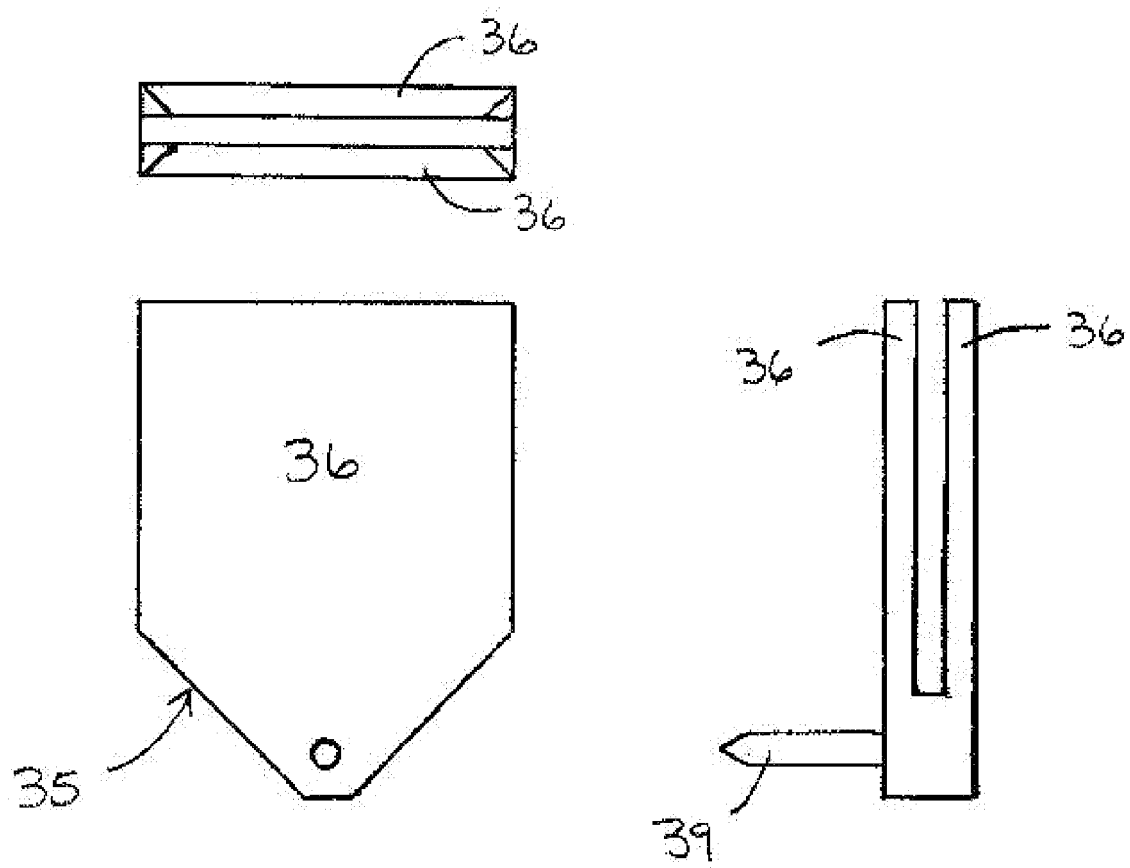
FIG. 15 shows top, front, and right side views of a trammel point pivot attachment means according to an embodiment of the present invention.

FIG. 15 shows top, front, and right side views of a trammel point pivot attachment 35 according to an embodiment of the present invention. The trammel point pivot attachment 35 is designed to fit specifically on one end of a level 11 opposite to the end of the slidable member 8 of the level 11. The point 39 on the scribe shown in the right side view allows the trammel point pivot attachment 35 to be positioned as desired by a user. The trammel point pivot attachment 35 when used in conjunction with trammel point sliding attachment 32 as referred to in FIG. 14, allows a user to create an arc or circle of desired length, size or degree. In addition, multiple trammel point pivot attachments 35 may be used in conjunction with the trammel point sliding attachment 32 pivot to create multiple arcs or circles simultaneously.

The level 11 and its attachment means may be made of any material as known in the art today, including but not limited to plastics, composites, carbon fiber, titanium, resins, aluminum, and various other metals. Furthermore, the present invention and its attachment means are not limited to any certain sizes as many different sizes and shapes may be contemplated by those skilled in the art for different applications.

An advantage of the present invention is that the level 11 provides for additional level lengths while enhancing accuracy, ease of use and advanced productivity. Thus, the present invention provides all the advantages of a traditional level with an advanced degree of accuracy when extending to level lines longer than the level itself. Furthermore, the present invention provides a level 11 having attachment means incorporating the advantages of the present invention into further embodiments for efficiently leveling at different angles, lengths, and shapes with the highest degree of accuracy and productivity. Thus, the present invention provides an accurate and versatile level 11 system.

The invention claimed is:

1. A level comprising:
a base having a top reference edge and a recession adjacent to the top reference edge;
a slidable member that fits within the recession of the base wherein the member is slidable to extend the top reference edge of the base for multiple lengths; and
said base further comprising level members.

2. The level of claim 1 wherein the slidable member fits within the recession of the base by a mating male dovetail part located on the bottom side of the slidable member and fitting within a mating female dovetail part in the recession of the base.

3. The level of claim 1 wherein the base includes a locking mechanism to lock the slidable member in place.

4. The level of claim 3 wherein the locking mechanism is a cammed lever.

5. The level of claim 3 wherein the slidable member has a channel carved in a side for receiving the locking mechanism.

6. The level of claim 1 wherein the level members include at least two spirit bubbles.

7. The level of claim 1 wherein the slidable member includes a cove top.

8. The level claim 1 wherein an upside down T is formed by a bottom part of the base.

9. The level of claim 1 wherein a magnet is located in the recession of the base and a mating magnet is located on the slidable member.

10. The level of claim 1 wherein the base includes a digital scale.

11. The level of claim 1 further including replaceable spirit bubbles.

12. The level of claim 1 further including a rule etched into a top surface of the slidable member.

13. The level of claim 1 further including a light located in a channel in the slidable member.

14. The level of claim 1 further including a laser inserted in the slidable member.

15. The level of claim 1 further comprising a linear attachment means at one end of the level for attaching two levels together.

16. The level of claim 1 further comprising a right angle attachment means for attaching to two levels together for forming a right angle level.

17. The level of claim 1 further comprising a protractor attachment means for attaching two levels together at a desired angle.

18. The level of claim 1 further comprising a trammel point sliding attachment and a trammel point pivot attachment.

* * * * *